US006987580B2

(12) United States Patent
Watanabe et al.

(10) Patent No.: US 6,987,580 B2
(45) Date of Patent: Jan. 17, 2006

(54) DOCUMENT TRANSMISSION APPARATUS AND A CELLULAR PHONE APPARATUS

(75) Inventors: Shinichi Watanabe, Yokohama (JP); Toshio Nagatsuka, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 982 days.

(21) Appl. No.: 09/837,454

(22) Filed: Apr. 19, 2001

(65) Prior Publication Data

US 2001/0034774 A1 Oct. 25, 2001

(30) Foreign Application Priority Data

Apr. 24, 2000 (JP) ............................. 2000-123178

(51) Int. Cl.
*G06F 15/00* (2006.01)
*G06K 1/00* (2006.01)
*H04M 11/00* (2006.01)

(52) U.S. Cl. ............... 358/1.15; 358/1.16; 379/102.02; 379/100.08; 455/556.2; 455/414.2

(58) Field of Classification Search ............... 358/1.15, 358/1.16; 379/142.07, 100.12, 100.08, 102.02; 710/6, 8, 12, 38; 709/223, 202, 203, 206, 709/217; 455/414.2, 556.2, 557, 418, 41.2, 455/41.3, 414.1; 345/169
See application file for complete search history.

(56) References Cited

U.S. PATENT DOCUMENTS 5,862,321 A * 1/1999 Lamming et al. ........... 709/200

6,240,445 B1 * 5/2001 Kumar et al. ............... 709/206
6,256,666 B1 * 7/2001 Singhal ...................... 709/217
6,430,601 B1 * 8/2002 Eldridge et al. ............ 709/206
2001/0029531 A1 * 10/2001 Ohta .......................... 709/223

FOREIGN PATENT DOCUMENTS

| JP | 7-212395 | | 8/1995 |
| JP | 07212395 A | * | 8/1995 |
| JP | 10-222527 | | 8/1998 |
| JP | 11-355498 | | 12/1999 |

OTHER PUBLICATIONS

English Language Abstract of JP 7-212395.
English Language Abstract of JP 10-222527.
English Language Abstract of JP 11-355498.

* cited by examiner

*Primary Examiner*—Kimberly Williams
*Assistant Examiner*—Thomas J. Lett
(74) *Attorney, Agent, or Firm*—Greenblum & Bernstein, P.L.C.

(57) ABSTRACT

A document transmission apparatus is provided that includes a print document manager that stores a document to be printed in association with an e-mail address of a user of a cellular phone. When the document to be printed is stored in the print document manager, a mail transmitter transmits a print notification message to the e-mail address of the user of the cellular phone. The print notification message indicates that the document to be printed is present. A print instruction acquirer acquires print instruction information from the cellular phone that receives the print notification message. A document transmitter transmits the document to be printed to a print destination designated in accordance with the print instruction information acquired by the print instruction acquirer.

20 Claims, 19 Drawing Sheets

Fig. 4

Document management table : 401

| Document number | Title | Text Data | Document type | Destination address | Notification counter |
|---|---|---|---|---|---|
| 1 | Patent materials | This invention is | MS-WORD | 09001234567@xxx.co.jp | 1 |
| 2 | Design materials | This Size is 132m | | 09012345678@xxx.co.jp | 3 |
| 3 | | | | | |

Fig. 5

Document type management table : 501

| Document type | MIME | Extension |
|---|---|---|
| MS-WORD | application / msword | doc |
| JPEG image | image / jpeg | jpg |
| HTML | text / html | html |
| Text | plane / text | txt |

Fig. 6

Mail address conversion table : 601

| Local mail account | Password | Cellular phone mail address |
|---|---|---|
| Taro.Matsushita | TMATSU | 09001234567@xxx.co.jp |
| Jiro.Matsushita | JMATSU | 09012345678@xxx.co.jp |
| Saburo.Matsushita | SMATSU | 09023456789@xxx.co.jp |
|  |  |  |

Fig. 7

Print destination management table:701

| Name of print destination | Address | Telephone number | Type of a printer | Printer address | Printer driver name | Unit price per a page |
|---|---|---|---|---|---|---|
| Osaka St. Store | Osaka shi … | 1111-22-3333 | IPP printer | 133.185.250.108 | For company A | 10yen |
| Nagoya St. Store | Nagoya shi … | 4444-55-6666 | FAX | 1234-56-7890 | TIFF conversion driver | 20yen |
| Tokyo St. Store | Tokyo to … | 7777-88-9999 | I-FAX | 133.185.250.76 ifax@tokyo.co.jp | TIFF conversion driver | 30yen |
| Fax direct input 701-1 | — | — | FAX | — | TIFF conversion driver | 50yen |
| | | | | | | |

Fig. 10

```
You have print data
Please click URL below http://PRTGWSVR/PrintRes.a
sp?uid=100
```

Fig. 11

```
《List of documents》
☐ 1  Map of NS building
☐ 2  Approval report
☐ 3
FAX
Instruct print destination
Deletion
```

Fig. 12

```
《Select Print Destination》
Please choose Print destination
    1  Osaka st. store
    2  Nagoya st. store
    3  Tokyo st. store Time  13:00
Return
```

Fig. 13

《Confirmation》
Printing will be done

Map of NS building as follows

[Print destination]
Tokyo st. store

Print
Return

Fig. 14

《FAX number input》
Please input fax number 1234-56-7890

Time 13:00
Run
Return

Fig. 15

```
《Confirmation》
Printing will be done

· Map of NS building as follows

[Output destination]
        1234-56-7890

[Print]
    Return
```

Fig. 16

```
《Acceptance result》
Print instruction has be accepted

· Map of NS building

[Print destination]
        Tokyo ST. Store

Return
```

Fig. 17

```
《Acceptance result》
Print instruction has be accepted

· Map of NS building

[Output destination]
        1234-56-7890

Return
```

Fig. 18

《Print result notification mail》
Printing has finished normally

[Detail]
 Document      Design materials
 Number        5pages
 Amount        50yen Print destination   Tokyo ST. Store
 Address             Yaesu guchi ···
 tel                 tel:1234-56-7890

Fig. 19

《Print result notification mail》
Printing has finished normally

[Detail]
 Document      Design materials
 Number        5pages
 Amount        250yen Output FAX number    1234-56-7890

Panasonic goods information
《List of documents》
On sale for fresh man

FAX
Instruct Print Destination
Deletion

DOCUMENT TRANSMISSION APPARATUS AND A CELLULAR PHONE APPARATUS

BACKGROUND OF THE INVENTION

1. Field of the Invention

This invention relates to a document transmission apparatus that can transmit a document or the like, such as an attachment file of an electronic mail or an HTML file, to a predetermined output device, and a cellular phone apparatus that can command the document transmission apparatus to perform a predetermined operation.

2. Description of Related Art

Recently, a cellular phone that can perform transmission and reception of an electronic mail by itself is spread. This type of cellular phone, similar to usual (ordinary) transmission and reception of an electronic mail performed by a personal computer (hereinafter as "PC"), can access a mail server and retrieve an electronic mail stored in a mail box of the mail server, to check a content of the electronic mail.

However, a display of a cellular phone is constructed to be smaller than a display of a general PC, etc., and the function is also simplified. Accordingly, for example, there is a problem that an attachment file etc. of an electronic mail cannot be opened to check the content.

Accordingly, the present invention is provided in view of the above-described problem, and an objective of the present invention is to provide a document transmission apparatus and a cellular phone apparatus that can check contents of an attachment file of an electronic mail.

SUMMARY OF THE INVENTION

To achieve the above and/or other goals, the present invention provides a document transmission apparatus that includes a print document manager that stores a document to be printed in association with an e-mail address of a cellular phone. When the document to be printed is stored in the print document manager, a mail transmitter transmits a print notification message to the e-mail address of the cellular phone. The print notification message indicates that the document to be printed exists. A print instruction acquirer acquires print instruction information from the cellular phone that receives the print notification message. A document transmitter transmits the document to be printed to a designated print destination in accordance with the print instruction information acquired by the print instruction acquirer.

According to the construction as described above, when there is a document to be printed for a user of a cellular phone, a print notification message is sent to the cellular phone. Then, the user of the cellular phone can designate a print destination of the document to be printed by using the cellular phone, and the document to be printed is printed out at the print destination. Accordingly, even if the user is out of his/her office, the user can confirm the contents of the document to be printed.

According to another aspect of the present invention, there is provided a cellular phone apparatus that receives a print notification message indicating that a print document exists from a document transmission apparatus. The cellular phone apparatus transmits a request for a print instruction screen to the document transmission apparatus, when a URL described in the print notification message is selected. The cellular phone apparatus displays the print instruction screen that is received in response to the request. The cellular phone apparatus further transmits the print instruction information to the document transmission apparatus, when the print instruction information is input through the print instruction screen.

According to the cellular phone apparatus as described above, the user can determine whether there is a document to be printed in a local server by using the cellular phone. In addition, the user can instruct printing of the document to be printed.

According to another aspect of the present invention, a document transmitter is provided including a URL input screen transmitter that transmits a screen to input a URL to a cellular phone in response to a request from the cellular phone. A home page information acquirer receives a URL information from the cellular phone and accesses a webserver having the URL information to obtain home page information. A print instruction acquirer acquires print instruction information from the cellular phone. Then, a document transmitter transmits the home page information to a designated print destination in accordance with the print instruction information acquired by the print instruction acquirer.

According to the construction as described above, when a user of the cellular phone watches homepage information out of his office, the user can designate a URL of a homepage and a print destination of the homepage information by using the cellular phone. Then, the home page information is printed out at the print destination. Accordingly, the user can confirm the contents of the homepage information even when he/she is out of his/her office.

According to further aspect of the present invention, there is provided a cellular phone apparatus transmits a request of a URL input screen to a document transmission apparatus. After a URL is input to the URL input screen that is received in response to the request of the URL input screen, the cellular phone apparatus transmits a request of a print instruction screen to the document transmission apparatus. Then, the cellular phone apparatus displays the print instruction screen that is received in response to the request of the print instruction screen. Finally, when a print instruction information is input through the print instruction screen, the cellular phone apparatus transmits the print instruction information to the document transmission apparatus.

According to the cellular phone apparatus described above, the user of the cellular phone can instruct printing of homepage information by using the cellular phone.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 shows a document management table used in the document transmission apparatus according to the first embodiment of the present invention.

FIG. 5 shows a document type management table used in the document transmission apparatus according to the first embodiment of the present invention.

FIG. 6 is a mail address conversion table used in the document transmission apparatus according to the first embodiment of the present invention.

FIG. 7 shows a print destination management table used in the document transmission apparatus according to the first embodiment of the present invention.

FIG. 10 is a view illustrating a display of the cellular phone when a print notification mail transmitted from the document transmission apparatus is displayed, according to the first embodiment of the present invention.

FIG. 11 is a view illustrating the display of the cellular phone when a document list screen transmitted from the document transmission apparatus is displayed, according to the first embodiment of the present invention.

FIG. 12 is a view illustrating the display of the cellular phone when a print destination designating screen transmitted from the document transmission apparatus is displayed, according to the first embodiment of the present invention.

FIG. 13 is a view illustrating the display of the cellular phone when a confirmation screen transmitted from the document transmission apparatus is displayed, according to the first embodiment of the present invention.

FIG. 14 is a view illustrating the display of the cellular phone when a FAX document number input screen transmitted from the document transmission apparatus is displayed, according to the first embodiment of the present invention.

FIG. 15 is a view illustrating the display of the cellular phone when another confirmation screen transmitted from the document transmission apparatus is displayed, according to the first embodiment of the present invention.

FIG. 16 is a view illustrating the display of the cellular phone when an accepting result screen transmitted from the document transmission apparatus is displayed, according to the first embodiment of the present invention.

FIG. 17 is a view illustrating the display of the cellular phone when another accepting result screen transmitted from the document transmission apparatus is displayed, according to the first embodiment of the present invention.

FIG. 18 is a view illustrating the display portion of the cellular phone when a print result notification mail transmitted from the document transmission apparatus is displayed, according to the first embodiment of the present invention.

FIG. 19 is a view illustrating the display portion of the cellular phone when another print result notification mail transmitted from document transmission apparatus is displayed, according to the first embodiment of the present invention.

DETAILED DESCRIPTION OF THE PREFERRED EMBODIMENTS

The embodiments of the present invention are explained in the following with reference to figures.

Figure 1:
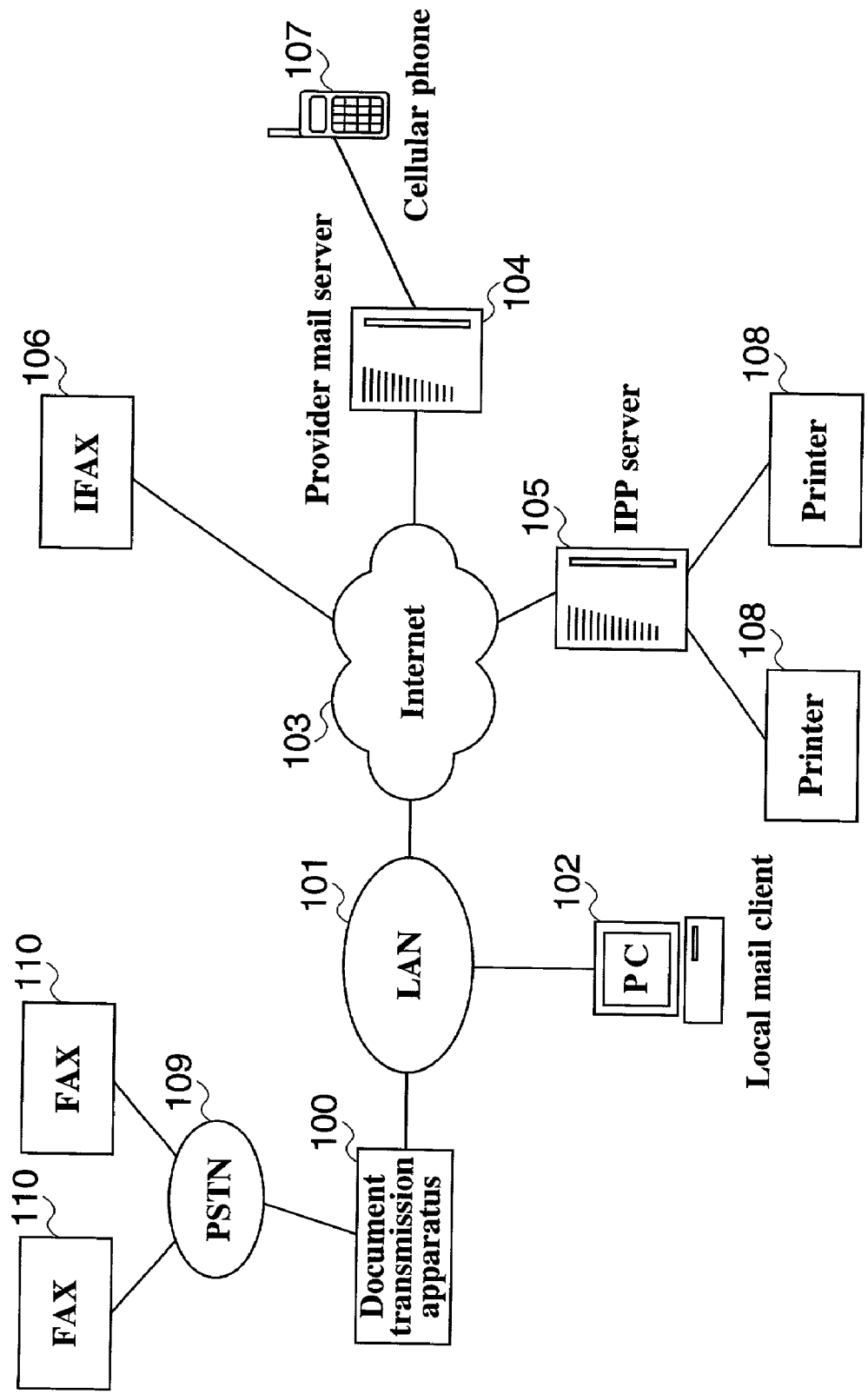
FIG. 1 is a schematic view illustrating a network on which a document transmission apparatus according to the first embodiment of the present invention is operated.

FIG. 1 is a schematic view illustrating a network on which the document transmission apparatus 100 is operated according to the first embodiment of the present invention.

As shown in FIG. 1, the document transmission apparatus 100 of the present invention, for example, is provided on a LAN 101 built in a company. An local mail client 102, which is configured by a PC, etc., is connected to the LAN 101. Further, the document transmission apparatus 100 has a function as an electronic mail server, and thus stores an electronic mail received from an Internet 103 into a mailbox corresponding to the mail address of the electronic mail. The local mail client 102 accesses the document transmission apparatus 100 at a predetermined timing or in response to a predetermined instruction (command), and retrieves an electronic mail when the electronic mail is stored in a corresponding mailbox. Thus, the local mail client 102 can receive an electronic mail from the Internet 103.

The document transmission apparatus 100 is connected to Internet 103 through the LAN 101. The document transmission apparatus 100 can access a mail server 104 of a provider (hereinafter "provider mail server"), an Internet protocol printer server 105 (hereinafter "IPP server"), and an Internet fax 106 (hereinafter as "I-FAX") through the Internet 103.

The provider mail server 104 performs wireless communication of electronic mail data with a cellular phone 107 according to a communication protocol specialized to the provider. Thus, the cellular phone 107 can perform transmission and reception of an electronic mail through the Internet 103. Further, the cellular phone 107 has a browser function. The browser function enables the cellular phone 107 to access a www server by using a URL, and to display a program screen formed from a predetermined HTML (Hyper Text Markup Language) file on a display.

The IPP server 105 is connected to printers 108, each of which has an IP address, and outputs print data to a predetermined one of the printers 108.

Further, the document transmission apparatus 100 is connected to facsimile devices 110 (hereinafter "FAX") via a public switched telephone network 109 (hereinafter "PSTN"), and outputs image data to a predetermined one of the FAXs 110.

Figure 2:
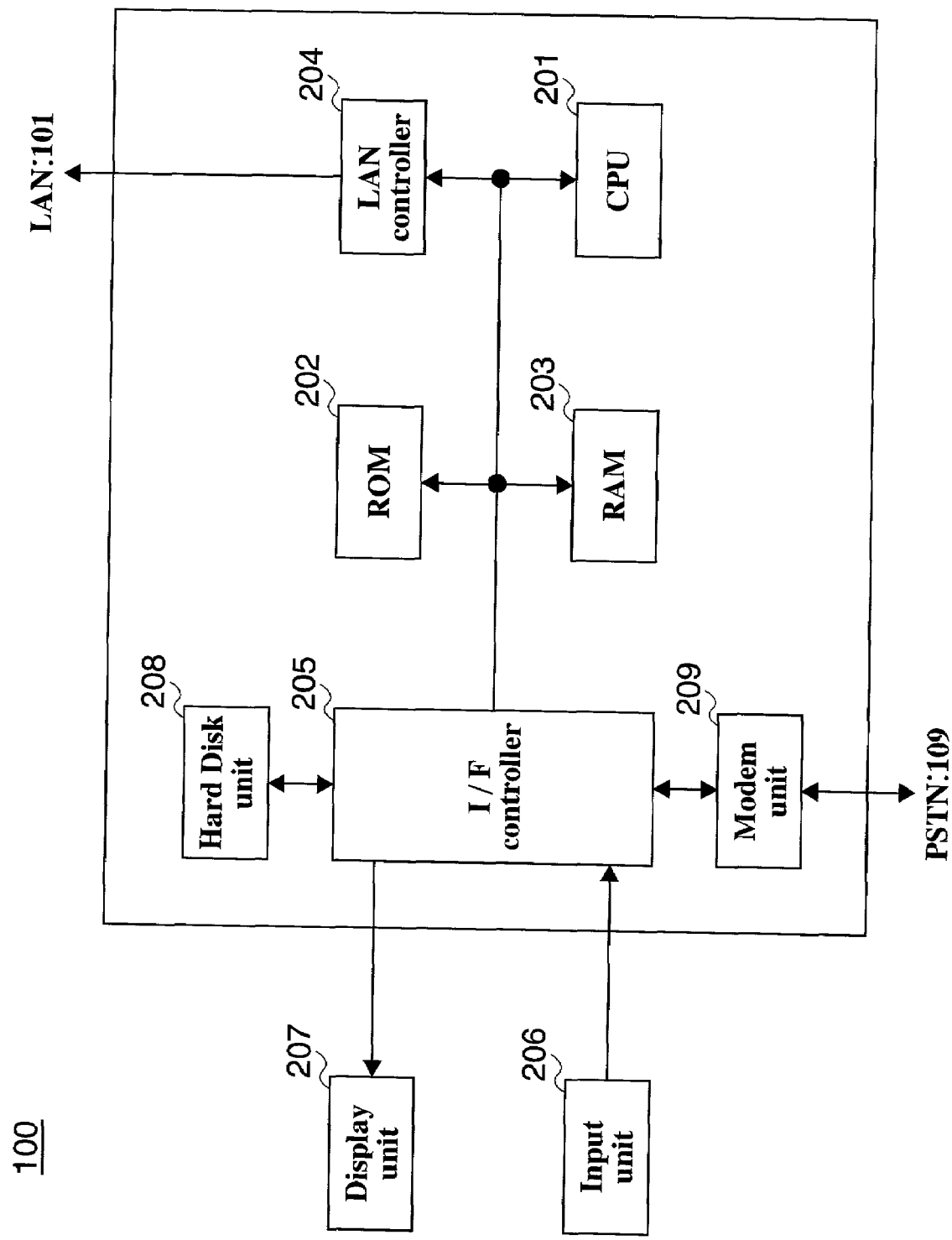
FIG. 2 is a block diagram illustrating hardware of the document transmission apparatus according to the first embodiment of the present invention.

FIG. 2 is a block diagram illustrating hardware of the document transmission apparatus 100.

In FIG. 2, a CPU (Central Processing Unit) 201 performs an objective process according to a program. A ROM (read only memory) 202 is a read only memory that stores an execution program to transmit and receive an electronic mail, an address conversion program to notify a reception of an electronic mail, which is described later, and an execution program to transmit a reception notification mail. A RAM (Random Access Memory) 203 is a main memory in which the CPU 201 loads a program and data to execute. A LAN controller 204 performs a process required to transmit data to and receive data from the LAN 101. Since the CPU 201 performs an execution program to transmit and receive an electronic mail, which is stored in the ROM 202, the document transmission apparatus 100 achieves transmission and reception of an electronic mail through the LAN controller 204 and LAN 101.

An I/F controller 205 is connected to an input unit 206, such as a keyboard, and a display unit 207, such as a CRT display or a LCD display, both of which are provided outside of the apparatus. Further, the I/F controller 205 is connected to a hard disk unit (hereinafter "HD unit") and a modem unit 209, both of which are provided inside of the apparatus. Thus, the I/F controller 205 controls data transmission among these units.

The input unit 206 is used when a user inputs a predetermined command or data and so on into the document transmission apparatus 100. The display unit 207 is used when a current status of the document transmission apparatus 100 or predetermined data is displayed.

The HD unit 208 stores data that are mainly used for controlling the document transmission apparatus 100. The modem unit 209 is connected to the PSTN 109, and performs transmission and reception of image data or a signal through the PSTN 109.

Figure 3:
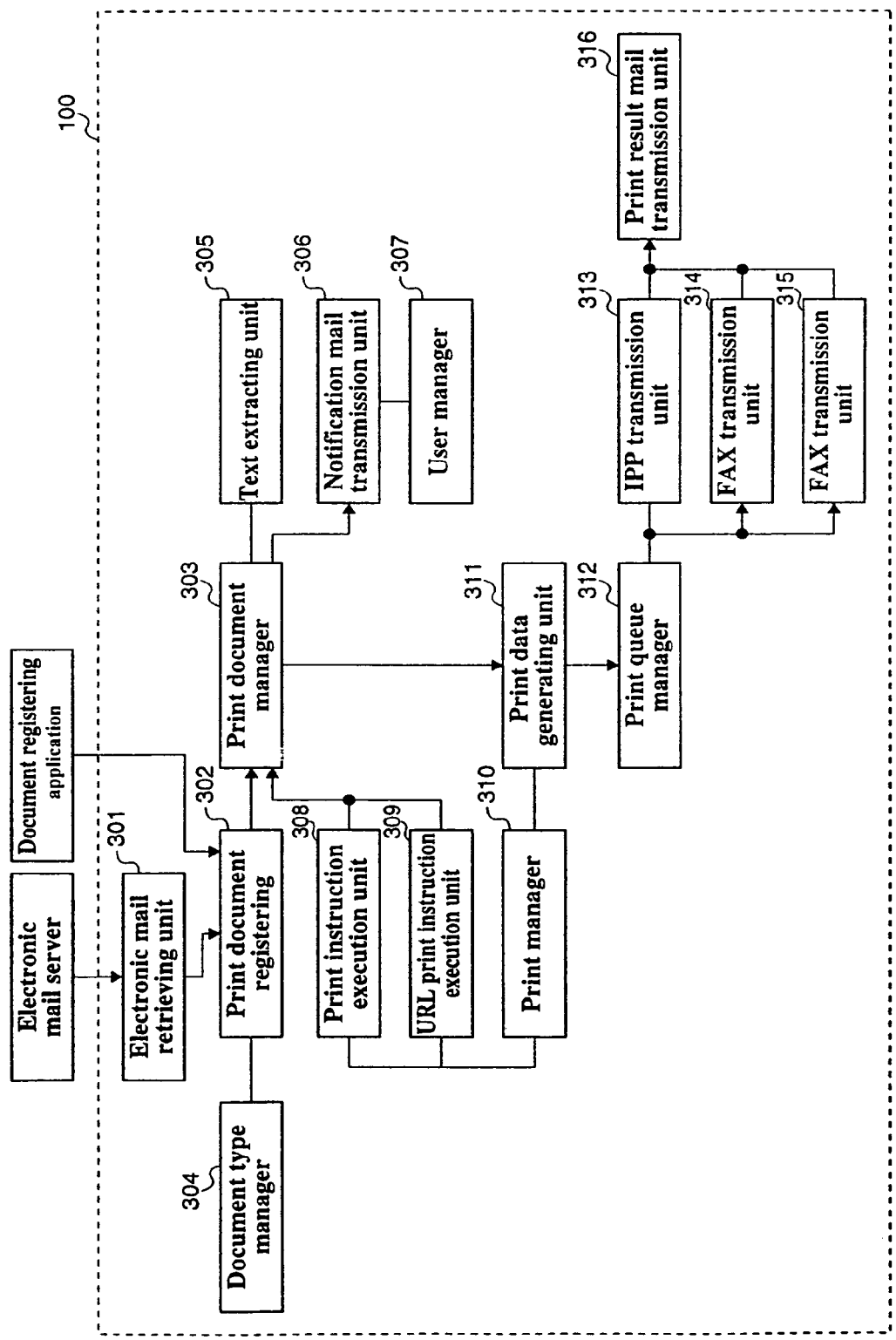
FIG. 3 is a block diagram illustrating functions of the document transmission apparatus according to the first embodiment of the present invention.

In the document transmission apparatus 100 having the hardware configuration as described above, functions realized by the CPU 201 controlling the above-described units are described with reference to FIG. 3. FIG. 3 is a block diagram illustrating functions of the document transmission apparatus 100.

In FIG. 3, an electronic mail retrieving unit 301 retrieves an electronic mail from a mailbox of a mail server provided in the document transmission apparatus 100, notifies a print document registering unit 302 of the retrieval of the electronic mail, and passes the retrieved electronic mail to the print document registering unit 302. More in detail, the electronic mail retrieving unit 301 retrieves an electronic mail for a user stored in a user manager 307, which is described later.

The print document registering unit 302 receives the electronic mail from the electronic mail retrieving unit 301, and stores a document to be printed (hereinafter "print document") in a print document manager 303. Here, the print document indicates a document that cannot be displayed on the cellular phone 107, and that may be an object to be printed by a predetermined output device. More in detail, the print document represents an attachment file of the electronic mail retrieved by the electronic mail retrieving unit 301. The print document registering unit 302 expands the attachment file, gives a unique document number, and stores the attachment file to the print document manager 303.

The print document manager 303 manages print documents by using a document management table 401 (FIG. 4). As shown in FIG. 4, the document management table 401 stores items including a document number, a title, text data, a document type, a destination address and a notification counter.

When the print document registering unit 302 stores a print document into the document management table 401, a document type manager 304 refers to a document type management table 501 shown in FIG. 5, and determines a type of the print document. In more detail, the type of the print document is determined based on a MIME (Multipurpose Internet Mail Extension) or an extension of the print document. At this time, the document type manager 304 gives a priority to the MIME of the print document to determine the document type. However, if the MIME is an application/octet-stream, the document type is determined based on the extension. Then, the document type manager 304 notifies the print document registering unit 302 of the determined type of the print document. The print document registering unit 302 stores the type of the print document to the print document management table 401 as a document type. The document type management table 501, as shown in FIG. 5, stores a MIME and an extension in association with a document type.

A text extracting unit 305 extracts text data from the print document that is stored in the document management table 401 by the print document registering unit 302. At this time, the text extracting unit 305 determines a type of the document according to an extension or a MIME of the print document to perform a corresponding extraction of text.

When there is a print document stored in the document management table 401, a notification mail transmission unit 306 sends an electronic mail to a mail address of a destination cellular phone 107 (hereinafter "cellular phone mail address"), to notify existence of the print document. Upon the notification, the notification mail transmission unit 306 transmits an electronic mail that includes a URL for a print instruction including a user identifier (hereinafter "UID") to identify the user.

The cellular phone mail address as a destination is stored in the document management table 401 as a destination address by referring to the mail address conversion table 601 shown in FIG. 6, which is stored in the user manager 307. The mail address conversion table 601, as shown in FIG. 6, includes a password and a cellular phone mail address in association with a local mail account. The cellular phone mail address means an e-mail address of a user of the cellular phone.

A print instruction execution unit 308 creates a print instruction screen based on data stored in the document management table 401 and a print destination management table 701, which is described later, and transmits the created print instruction screen to the cellular phone 107. Further, the print instruction execution unit 308 processes commands and data transmitted from the cellular phone that receives the print instruction screen.

A URL print instruction execution unit 309 transmits a screen to input a URL (hereinafter "URL input screen") to the cellular phone 107, as described in detail in the second embodiment. Further, the URL print instruction execution unit 309 processes commands and data transmitted from the cellular phone 107 that receives the URL input screen.

A printer manager 310 includes a print destination management table 701 shown in FIG. 7, and manages information of a printer of a print destination, and so on. The print destination management table 701, as shown in FIG. 7, stores, for example, a convenience store name as a name of print destination, and an address and a telephone number corresponding to the print destination. The print destination management table 701 further stores a type of a printer (output device) installed in the print destination, a printer address, a printer driver name corresponding to the printer and a unit price per a page. The print destination management table 701 further stores management data of a fax direct input 701-1, which is used when a fax number is directly input. For the fax direct input 701-1, a "FAX" is stored as the type of printer, and a "TIFF conversion driver" is stored as the printer driver name.

A print data generating unit 311 retrieves a print document to which the print document manager 303 submits a print instruction, and generates print data according to the type of an output device installed at the designated print destination by referring to the print destination management table 701. The print data generating unit 311 passes the generated print data to a print queue manager 312.

The print queue manager 312 receives the print data generated by the print data generating unit 311, and performs queuing to send an output instruction to the output device installed at the designated print destination. At this time, the print queue manager 312 gives the output instruction to the output device by referring to an IP address, a fax number, a mail address of I-FAX, and so on, which are stored as the printer address, corresponding to the designated print destination stored in the print destination management table 701 of the print manager 310.

An IPP transmission unit 313 activates an IPP protocol, and transmits print data to the (IPP) printer 108 via the IPP server 105 connected through Internet 103. A FAX transmission unit 314 transmits the print data to the FAX 110 connected through PSTN 109. An I-FAX transmission unit 315 transmits print data to I-FAX 106 connected through Internet 103, by using SMTP protocol. Then, the IPP transmission unit 313, the FAX transmission unit 314 and the I-FAX transmission unit 315 notify a print result mail transmission unit 316 of a print result of the transmitted print data.

The print result mail transmission unit 316 receives the notification of the print result, and notifies the cellular phone 107 of the print result by using an electronic mail.

Storing the print document into the print document registering unit 302 is not limited to storing an attachment file of an electronic mail. Rather, it is possible to directly store a document by using a document storing application (AP).

Figure 8:
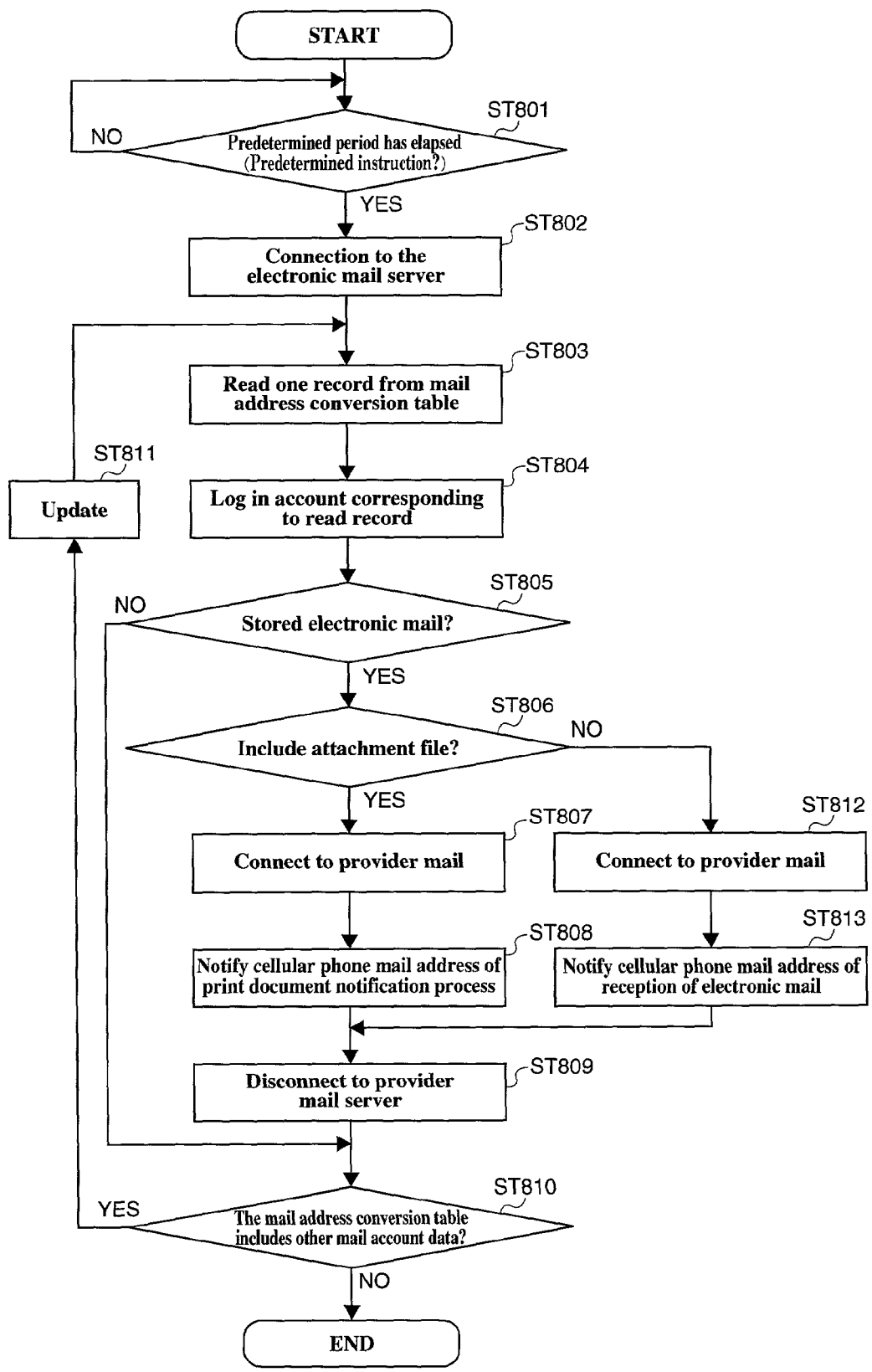
FIG. 8 is a flowchart illustrating an operation when the document transmission apparatus notifies a predetermined cellular phone of existence of a print document according to the first embodiment of the present invention.

Next, an operation in which, after the document transmission apparatus 100 having the above-described configuration notifies a predetermined cellular phone 107 of existence of a print document, the print document is printed out at a print destination designated by a predetermined operation at the cellular phone 107, is explained with reference to FIG. 8.

To make the document transmission apparatus 100 notify the predetermined cellular phone 107 of existence of a print document, or the like, a previous setting is required. In other words, when a user of the local mail client 102 is going out, the user is required to set the document transmission apparatus 100 to notify the cellular phone 107 of existence of a print document, or the like.

As described above, if the notification of existence of a print document, or the like, is set, the CPU 201 of the document transmission apparatus 100 monitors whether a predetermined period has elapsed. When the predetermined period has elapsed (ST801), the CPU 201 of the document transmission apparatus 100 establishes a connection to the electronic mail server (ST802). As an alternative to check (or monitor) a lapse of the predetermined period as described above, the CPU 201 can establish a connection to the electronic mail server when the user of the document transmission apparatus 100 inputs a predetermined instruction (command).

When a connection to the electronic mail server is established, the CPU 201 reads one record of mail account data from the mail address conversion table 601 stored in the user manager 307 in the HD unit 208 (ST803).

Then, the CPU 201 logs in the account corresponding to the read record (ST804). At this time, the CPU 201 logs in the account by using a local mail account and a password read from the mail address conversion table 601.

When the CPU 201 logs in the account, the CPU 201 sends a query to the electronic mail server, and determines whether the mailbox corresponding to the account stores an electronic mail based on the response to the query from the electronic mail server (ST805).

When an electronic mail is stored in the mailbox corresponding to the account, the CPU 201 determines whether a received electronic mail includes an attachment file (ST806). More in detail, the CPU 201 reads the header of the received electronic mail to determine whether there is an attachment file. Here, it is assumed that the received electronic mail includes an attachment file. In other words, it is assumed that there is a print document directed to the user of the account.

After determining whether the received electronic mail has an attachment file, the CPU 201 establishes a connection to the provider mail server 104 through the internet 103 (ST807). Here, it is assumed that the IP address of the provider mail server 104 is previously set to the document transmission apparatus 100.

Since the received electronic mail has an attachment file, the CPU 201 performs a print document notification process to the cellular phone mail address in the mail account data currently being read (ST808). The print document notification process is described later.

Thereafter, the CPU 201 disconnects the connection to the provider mail server 104 (ST809). Then, the CPU 201 determines whether the mail address conversion table 601 includes other mail account data (ST810). When there is other mail account data, the mail account data to be read is updated to the next mail account data (ST811), then one record of the next mail account data is read from the mail address conversion table 601 (ST803). Then, the process from ST804 to ST810 is repeated for the read mail account data.

When it is determined in ST805 that the mail address conversion table 601 does not include another mail account data, the CPU 201 terminates the process.

When it is determined in ST805 that the mailbox corresponding to the account does not store an electronic mail, the CPU 201 proceeds the process to ST810 to determine whether the mail address conversion table 601 further includes another mail account data.

Further, when it is determined in ST806 that the received electronic mail does not include an attachment file, in other words, the received electronic mail is a normal electronic mail, the CPU 201 establishes a connection to the provider mail server 104 through the internet 103 (ST812). Then, the CPU 201 notifies the cellular phone mail address in the currently read mail account data of reception of an electronic mail by using electronic mail (ST813).

Thereafter, the CPU 201 disconnects the connection to the provider mail server 104 (ST809). Then, the CPU 201 determines whether the mail address conversion table 601 includes the other mail account data (ST810).

Figure 9:
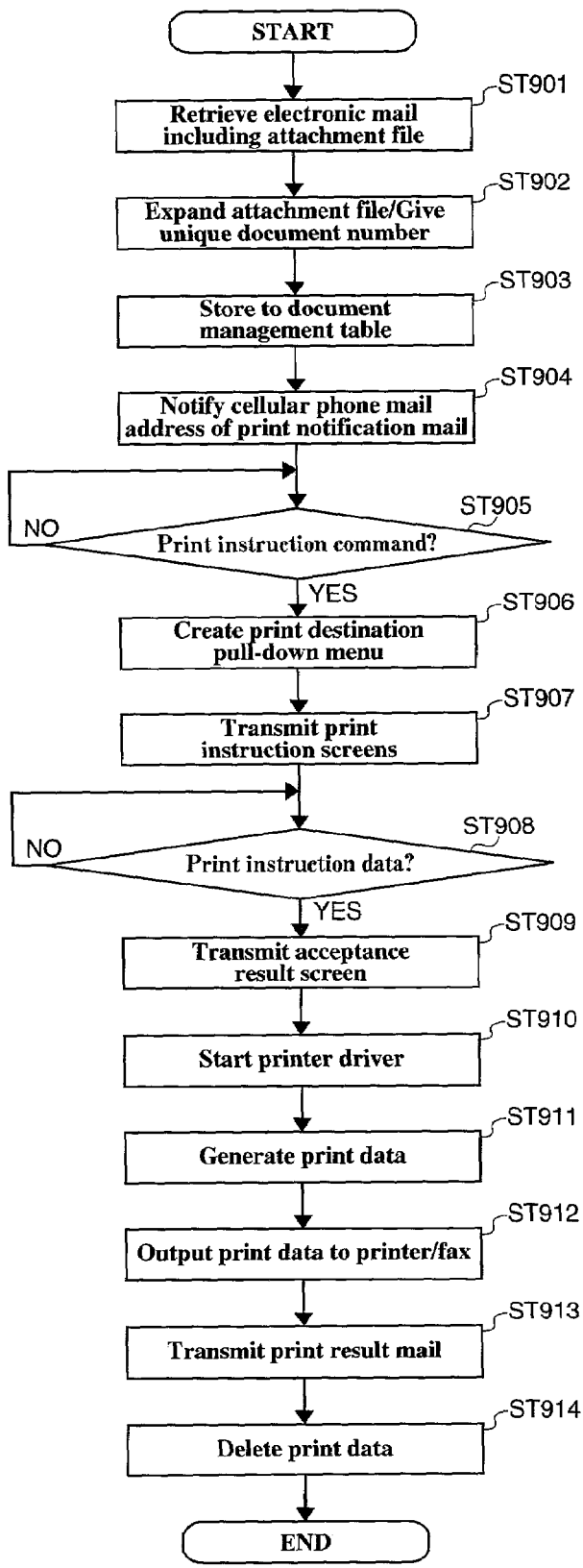
FIG. 9 is a flowchart illustrating an operation when, after the document transmission apparatus notifies the cellular phone of existence of a print document, and when a predetermined printing device outputs the print document according to an instruction come from the cellular phone according to the first embodiment of the present invention.

Next, the above-described print document notification process is explained in detail with reference to FIG. 9. FIG. 9 is a flowchart illustrating an operation in which, after the document transmission apparatus 100 notifies the cellular phone 107 of existence of a print document, the print document is output by a predetermined output device in response to an instruction from the cellular phone 107.

When the print document notification process is performed, firstly, the electronic mail retrieving unit 301 retrieves an electronic mail including the attachment file from the electronic mail server (ST901), then the retrieved electronic mail is given to the print document registering unit 302.

The print document registering unit 302 expands the attachment file of the electronic mail to obtain a print document, gives a unique document number to the print document (ST902), and stores the print document to the document management table 401 (ST903).

At this time, the print document registering unit 302 stores a subject (title) of the electronic mail as the "title" item in the document management table 401. When the electronic mail does not have a subject, a first couple of characters of the body of the electronic mail is stored as the "title" item.

The document type manager 304 searches the document type management table 501 using MIME data described in the header of the electronic mail or an extension of the print document (attachment file) as a search key to determine the document type of the attachment file, and notifies the print document registering unit 302 of the determined document type. In response to the notification of the document type, the print document registering unit 302 stores the document type to the document management table 401.

After the print document is stored into the document management table 401, the notification mail transmission unit 306 notifies the cellular phone mail address corresponding to the local mail account of the existence of the print document, by using an electronic mail. At this time, the notification mail transmission unit 306 identifies the cellular phone mail address by referring to the mail address conversion table 601 in the user manager 307. Hereinafter, the electronic mail to notify existence of a print document is called as a print notification mail.

At this time, the notification mail transmission unit 306 describes a print instruction URL including a UID, by which the document transmission apparatus 100 identifies the user, in the print notification mail, and transmits the print notification mail (ST904).

FIG. 10 is an example of a display of the cellular phone 107, when the print notification mail transmitted from the notification mail transmission unit 306 is displayed. After the print notification mail as shown in FIG. 10 is displayed on the cellular phone 107, when the user of the cellular phone 107 clicks on the URL described in the print notification mail, a print instruction command is output to the document transmission apparatus 100 (ST905).

When the print instruction command is received, the print instruction execution unit 308 extracts a list of documents directed to the user from print document data stored in the document management table 401 by using the UID, and extracts print destination data from the print destination management table 701, and creates a print destination pull-down menu by using the document list and the print destination data (ST906).

Then, print instruction screens including the created print destination pull-down menu are transmitted to the cellular phone 107 (ST907). FIGS. 11–15 illustrate displays of the cellular phone 107 when the transmitted print instruction screens are displayed. As described in the following, the print instruction screens include a document list screen, a print destination designation screen, a fax number input screen, a confirmation screen, and so on.

FIG. 11 is a document list screen. The document list screen displays a list of print documents directed to the user of the cellular phone 107 stored in the document management table 401. When a print document is selected from the list of print documents, detailed contents of the selected print document is displayed on the cellular phone 107. The display of the detailed contents of the print document is described later. In the lower side of the document list, menu keys "FAX", "Designate Print Destination" and "Delete" are displayed. When one of these menu keys is selected, the next screen is displayed on the display of the cellular phone 107. The case when the "delete" key is selected is described later.

FIG. 12 is a print destination designation screen which is displayed when the "Designate Print Destination" key is selected from the document list screen. The print destination designation screen displays a list of print destinations stored in the print destination management table 701. Further, the lower side of the print destination designation screen includes an area to input a time designation.

FIG. 13 is a confirmation screen which is displayed when a print destination is designated in the print destination designation screen. The confirmation screen displays a document selected in the document list screen and a print destination designated in the print destination designation screen. Further, in the lower side of the confirmation screen, "Print" key is displayed. When the "Print" key is selected, a print instruction is output to the document transmission apparatus 100.

FIG. 14 is a fax number input screen that is displayed when the "FAX" key is selected in the document list screen. The fax number input screen includes an area to input a fax number. Further, in the lower side of the fax number input screen, a "Run" key is displayed to perform a fax transmission.

FIG. 15 is a confirmation screen that is displayed when the "Run" key is selected from the fax number input screen. The confirmation screen includes the document selected from the document list screen and the destination fax number input in the fax number input screen. Further, in the lower side of the confirmation screen, "Print" key is displayed. When the "Print" key is selected, a print instruction is output to the document transmission apparatus 100.

When these print instruction screens are displayed on the display of the cellular phone 107 and a print instruction from the user is transmitted (ST908), the print instruction execution unit 308 receives the print instruction and transmits an acceptance result screen to the cellular phone 107 (ST909). FIGS. 16 and 17 are views illustrating a display of the cellular phone 107 when the acceptance result screen transmitted from the document transmission apparatus 100 is displayed.

FIG. 16 is an example of the acceptance result screen, which is displayed when a print instruction is output through the confirmation screen shown in FIG. 13. The acceptance result screen displays contents of the print instruction accepted by the document transmission apparatus 100. FIG. 17 is another example of the acceptance result screen, which is displayed when a print instruction is output through the confirmation screen shown in FIG. 15.

After these acceptance result screen are transmitted to the cellular phone 107, the print data generating unit 311 activates a printer driver corresponding to the print destination (or output destination) designated by the user of the cellular phone 107 (ST910). More in detail, the print data generating unit 311 retrieves a printer driver name from the print destination management table 701 to activate the corresponding printer driver. Then, the print data generating unit 311 retrieves a print document designated by the user from the document management table 401 and generates print data (ST911).

For example, as shown in FIG. 16, when "Tokyo Station Square Convenience Store" is received as a print destination, the print data generating unit 311 activates a TIFF conversion driver, which is stored as a printer driver name in the print destination management table 701. Then, the print data generating unit 311 retrieves a "map of NS building" from the document management table 401, and generates a TIFF file.

On the other hand, as shown in FIG. 17, when a number "1234-56-7890" is received as an output destination, the print data generating unit 311 activates a TIFF conversion driver, which is stored as a printer driver name in the print destination management table 701, as a printer driver for a FAX direct input. Then, the print data generating unit 311 retrieves a "map of NS building" from the document management table 401, and generates a TIFF file.

At this time, the print data generating unit 311 obtains page number data of the print data, and manages the page number data. Further, when a print time is designated in the print destination designation screen, the print process is performed when the designated time comes.

When the print data generating unit 311 generates the print data, the print queue manager 312 determines a printer address and a printer type corresponding to the print destination designated by the user of the cellular phone 107 by referring to the print destination management table 701 so as to determine a destination to be connected and a transmission protocol. Then, the print queue manager 312 instructs a printer output (or a fax output) of the generated print data (ST912).

In the above-described example as shown in FIG. 16, the destination to be connected and the transmission protocol are determined by obtaining the printer address "133.185.250.76" and the printer type "I-FAX" corresponding to the "Tokyo Station Square Convenience Store". Then, since the printer type is "I-FAX," the I-FAX transmission unit 315 activates IPP protocol, and outputs the print data to the (IPP) printer 108 via the IPP server 105, which is connected through Internet 103, etc.

On the other hand, in the example of FIG. 17, since the output destination is designated by a direct input of a FAX number, the fax transmission unit 314 outputs the print data to the FAX 110 connected through the PSTN 109.

At this time, the document transmission apparatus 100 obtains the data of printed page number from the response coming from the printer, etc., of the output destination, and manages the page number data. This is effective when the page number data of the print data cannot be obtained at the time of generation of the print data. The page number data obtained at the time of generation of the print data have priority over the page number data obtained from the printer, etc., of the output destination.

When the print data is output, the print result mail transmission unit 316 transmits a print result mail to the cellular phone mail address (ST913). FIGS. 18 and 19 are views illustrating displays of the cellular phone 107 when the print result notification mail screen is displayed.

FIG. 18 is a print result notification mail screen corresponding to the print instruction accepted in FIG. 16. The print result notification mail screen includes a print result and its detailed information. The detailed information, as shown in FIG. 18, includes a printed document name, a printed page number, and a cost. Further, a print destination is also displayed therebelow. A telephone number is displayed as a part of the print destination. The user of the cellular phone 107 can select the telephone number to call the telephone number. Thus, the user, if necessary, can easily confirm the print of the print document to the telephone number. FIG. 19 is a print result notification mail screen corresponding to the print instruction accepted in FIG. 17. This screen is different from the print result notification mail screen shown in FIG. 18 in the point that the output (destination) fax number is displayed.

Since, as described above, the print result notification mail screen displays a cost, the user of the cellular phone 107 can recognize the cost charged to print the print document.

Then, after the print result notification mail screen is transmitted, the data of the print document is deleted from the document management table 401 (ST914).

As described above, the operation in which the document transmission apparatus 100 notifies the cellular phone 107 of existence of a print document, and the print document is printed at a print destination designated by a predetermined operation at the cellular phone 107, is terminated.

According to the document transmission apparatus 100 of the first embodiment of the present invention, when there is a print document for a predetermined electronic mail address, a print notification mail is transmitted to a predetermined cellular phone 107. Then, after the cellular phone 107 receives the print notification mail, for example, print of the print document by the predetermined printer, etc., which is installed in a convenience store, etc., can be instructed by using the cellular phone 107. The document transmission apparatus 100 outputs the print data to the predetermined printer, etc., in response to the instruction from the cellular phone 107. Accordingly, the user of the cellular phone 107 can confirm the contents of an attachment file, etc., of a predetermined electronic mail at the outside of the office, by designating a printer, a fax and so on in a convenience store, etc., close to the place where the user stays currently.

Further, at this time, since the document transmission apparatus 100 can designate either of an IP printer, a FAX, or an I-FAX, etc., as a print destination, the user can select an output device closest to the place the user presently stays.

Further, in this embodiment, the document transmission apparatus 100 is provided on the LAN 101 provided in a company, and an attachment file of an electronic mail received by a mail address corresponding to the local mail client 102. However, it is possible that the Internet service provider has the document transmission apparatus 100 and processes the electronic mail received by a mail address corresponding to the local mail client 102.

Further, when the Internet service provider has the document transmission apparatus 100, reception of an electronic mail including an attachment file transmitted to the mail address corresponding to a personal subscriber client who performs a dial-up connection to the Internet service provider can be notified to the cellular phone 107 possessed by the user. In this modification, since an electronic mail is retrieved by dial up connection from a PC, etc., only when reception of an electronic mail including an attachment file is notified to the cellular phone 107, communication cost required when the dial-up connection is established can be reduced.

Figure 20:
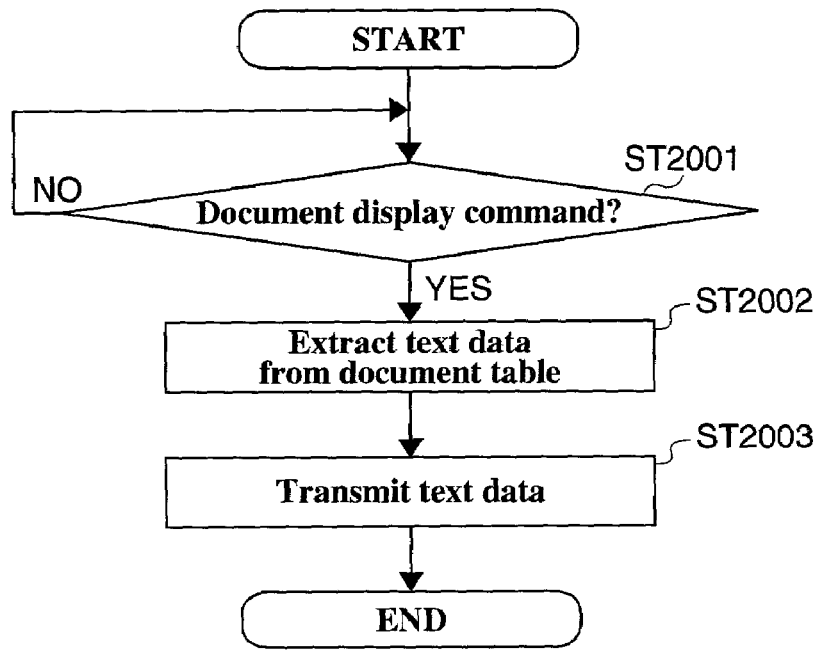
FIG. 20 is a flowchart illustrating an operation when the document transmission apparatus transmits detailed information of a print document according to the first embodiment of the present invention.

Further, in ST907, after the document list screen of the print instruction screen shown in FIG. 11 is displayed on the display of the cellular phone 107, when one of the print documents is selected, as shown in FIG. 20, the cellular phone 107 outputs a document display command as well as the document number to the document transmission apparatus 100. Then, when the document number and the document display command are output (ST2001) by the cellular phone 107, the print instruction execution unit 308 specifies the print document according to the document number. Then, the print instruction execution unit 308 extracts text data corresponding to the specified print document from the document management table 401 (ST2002). Then, the print instruction execution unit 308 extracts characters within the number that can be displayed on the display of the cellular phone 107, from the extracted text data, and transmits the characters to the cellular phone 107 (ST2003). It is assumed that the document transmission unit 100 recognizes, in advance, the number of characters that can be displayed on the display of the cellular phone 107.

In the present embodiment, the text extracting unit 305 extracts the text data when the print document registering unit 302 stores the print document. However, the text extracting unit 305 can extract the text data when receiving the document display command.

Figure 21:
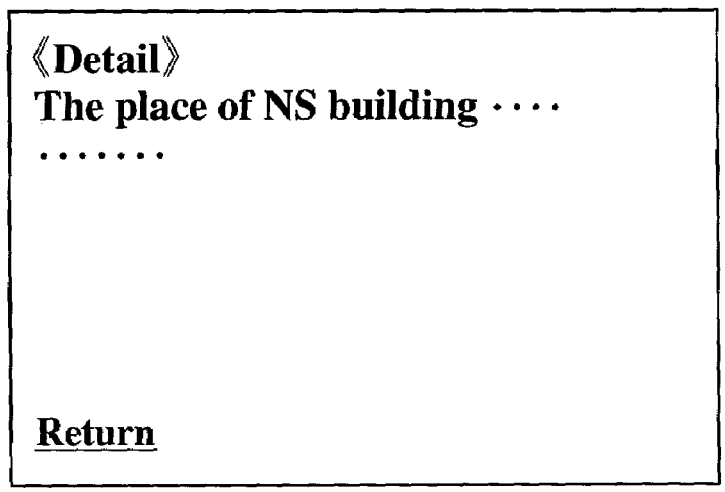
FIG. 21 is a view illustrating the display of the cellular phone when a detail screen transmitted from the document transmission apparatus is displayed, according to the first embodiment of the present invention.

FIG. 21 is a detail screen that is displayed when, for example, a "map of NS building" of the document number 1 is selected from the document list screen shown in FIG. 11. The detail screen displays the details of the contents of the "map of NS building" as shown in FIG. 21. Thus, the user of the cellular phone 107 recognizes the contents to some extent, before the user instructs printing of the contents of the print document.

Figure 22:
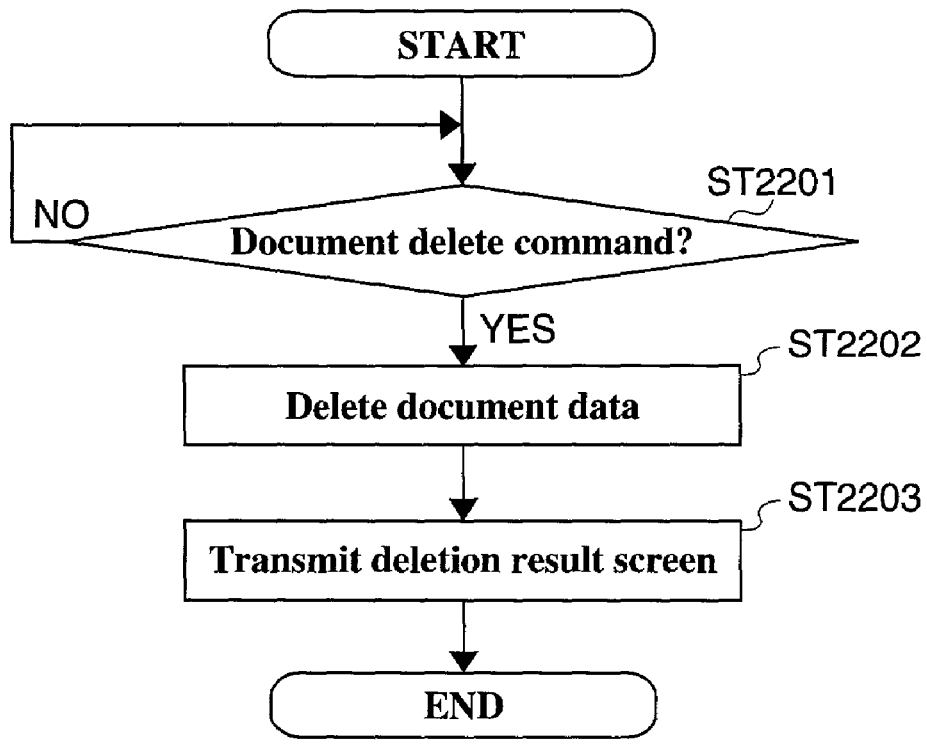
FIG. 22 is a flowchart illustrating an operation when the document transmission apparatus deletes a print document according to the first embodiment of the present invention.

Further, after the document list screen of the print instruction screen shown in FIG. 11 is displayed on the display of the cellular phone 107, when the "Delete" key is selected, as shown in FIG. 22, the cellular phone 107 outputs a document delete command as well as the document number to the document transmission apparatus 100. Then, when the document number and the document delete command is output (ST2201) from the cellular phone 107, the print document manager 303 specifies the print document according to the document number. Then, the print document manager 303 deletes data of the specified print document from the document management table 401 (ST2202). When the data of the specified print document is deleted, a deletion result screen is transmitted to the cellular phone 107 (ST2203).

Figure 23:
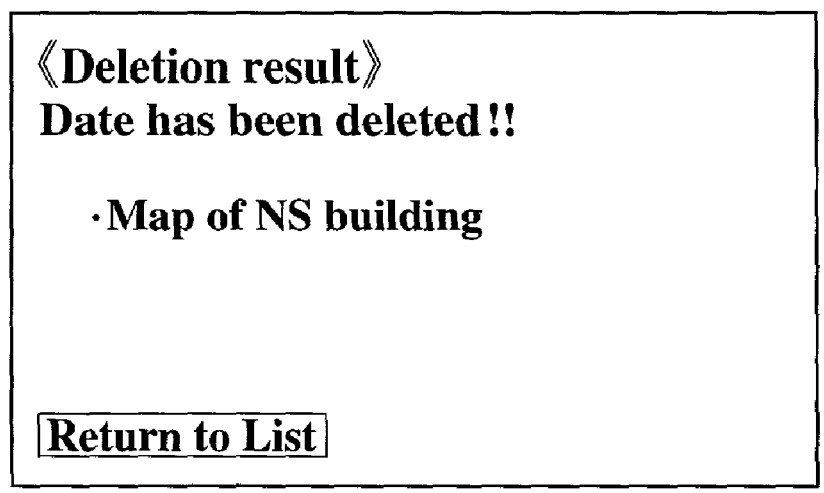
FIG. 23 is a view illustrating the display of the cellular phone when a deletion result screen transmitted from the document transmission apparatus is displayed, according to the first embodiment of the present invention.

FIG. 23 is the deletion result screen which is displayed when the "map of NS building" of the document number 1 is selected from the document list screen shown in FIG. 11 and the "Delete" key is selected. Since the deletion result screen displays the deleted print document, as shown in FIG. 23, the user of the cellular phone 107 can confirm whether the print document is securely deleted.

The document transmission apparatus 100, as described above, determines whether there is a print document directed to the user of the cellular phone 107 after a predetermined period has elapsed, and outputs the print notification mail to the cellular phone 107 when there is a print document. Then, when a predetermined instruction is transmitted from the user of the cellular phone 107 that receives the print notification mail, the document transmission apparatus 100 deletes the printed print document. Accordingly, the print document for which the user of the cellular phone 107 does not instruct to print, remains in the HD unit 208 of the document transmission apparatus 100.

Figure 24:
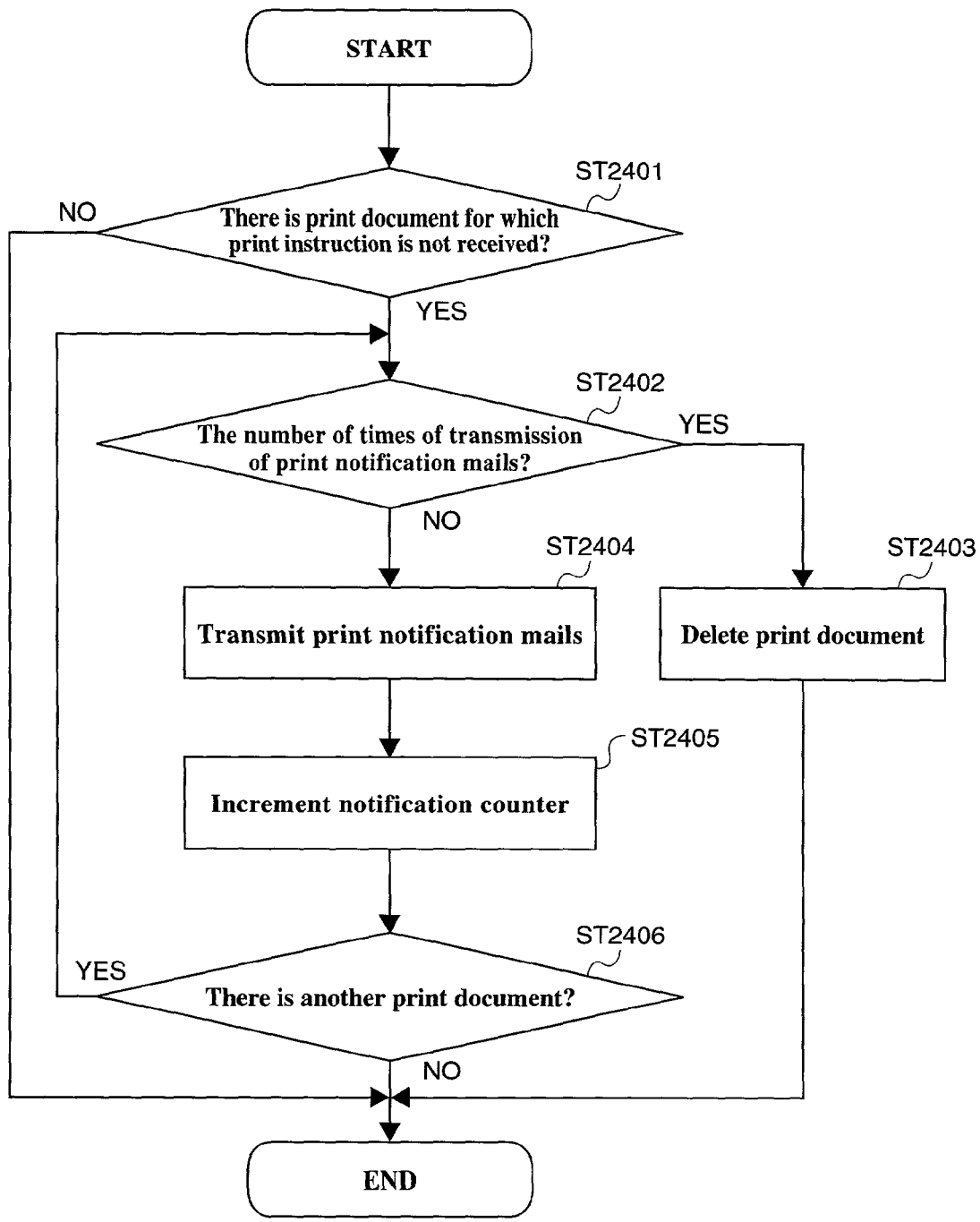
FIG. 24 is a flowchart illustrating an operation when the document transmission apparatus deletes a predetermined print document according to the first embodiment of the present invention.

However, it is not preferable that the print document that are not printed continuously remain in the HD unit 208 because of the memory capacity of the HD unit 208. Accordingly, the document transmission apparatus 100 discards the print document from the HD unit 208 after print notification mail has been sent to the cellular phone 107 for a predetermined number of times. In the following, in the document transmission apparatus 100, an operational flow in which the document transmission apparatus 100 deletes the print document after the print notification mails are sent for a predetermined number of times is described with reference to FIG. 24.

The document transmission apparatus 100 periodically determines whether there is a print document for which a print instruction is not received, to perform a deletion process of the print document (ST2401). The determination whether there is a print document or not is performed for one record after another of the print documents stored in the document management table 401.

When there is a print document for which a print instruction is not received, it is determined whether the number of times of transmission of print notification mails for the print document to the cellular phone 107 exceeds a predetermined number (ST2402). More in detail, the content of the notification counter in the document management table 401 is referred to determine whether the number of times of transmission of print notification mails exceeds the predetermined number.

Here, when the number of times of transmission of the print notification mails exceeds the predetermined number, data of the print document is deleted from the document management table 401 (ST2403), and then, the deletion process of the print document is terminated.

When the number of times of the transmission of the print notification mails does not exceed the predetermined number, another print notification mail is transmitted to the user of the destination address of the print document (ST2404). Then, the notification counter managed by the document management table 401 is incremented (ST2405).

Then, after the notification counter is incremented, it is determined whether the document management table 401 includes another print document that is not instructed to be printed (ST2406). Then, when there is another print document that is not instructed to be printed, the process is returned to ST2402, and the process after ST2402 is repeated. On the other hand, if there is no print document that is not instructed to be printed, the deletion process of print documents is terminated.

In ST2405, when the notification counter of the print document is incremented, the transmission of a print notification mail for the print document for which a print notification mail has already been transmitted in the same loop of the deletion process, is omitted. In other words, in a loop of the deletion process of print documents, the print notification mail is transmitted only once for each print document.

As described above, since the document transmission apparatus 100 deletes a print document for which print notification mail are transmitted more than a predetermined number of times, from the HD unit 208, it is possible to prevent unnecessary print documents from remaining in the HD unit 208, and to use effectively the memory capacity of the HD unit 208.

The document transmission apparatus 100 according to the first embodiment of the present invention determines whether there is a print document in a predetermined electronic mail address, transmits a print notification mail to the cellular phone 107 when there is a print document, and controls printing of the print document according to a print instruction transmitted from the cellular phone 107. On the other hand, the document transmission apparatus 100 according to the second embodiment of the present invention, for example, downloads a group of HTML files, based on a URL transmitted from the cellular phone 107, transmits a screen for printing the group of HTML to the cellular phone 107, and controls printing of the group of HTML files according to a print instruction transmitted from the cellular phone 107.

Figure 25:
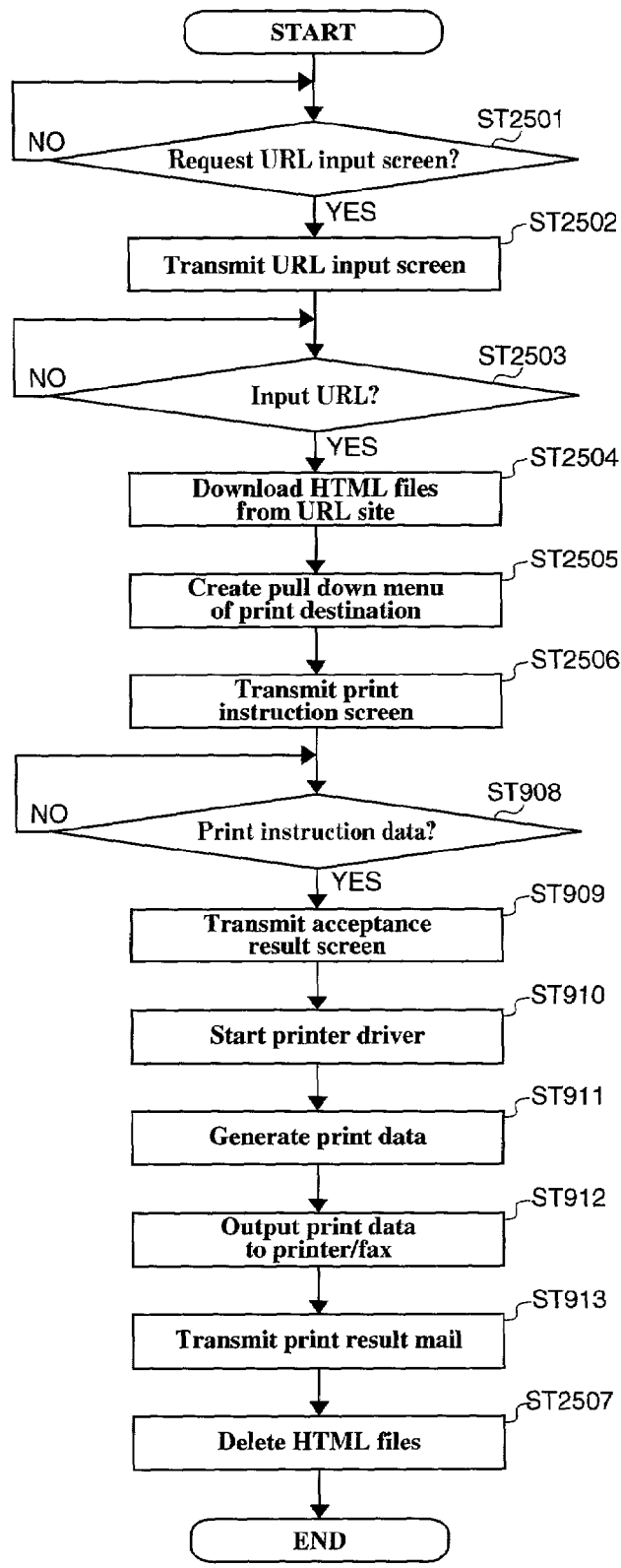
FIG. 25 is a flowchart illustrating an operation when the document transmission apparatus controls printing of a group of HTML files according to a second embodiment of the present invention.

In the following, an operation of the document transmission apparatus 100 according to the second embodiment of the present invention is described with reference to FIG. 25. FIG. 25 is a flowchart illustrating an operation when the document transmission apparatus 100 of the second embodiment controls printing of the group of HTML files.

When the user of the cellular phone 107 requests a URL input screen (ST2501), the URL print instruction execution unit 309 of the document transmission apparatus 100 outputs the URL input screen to the cellular phone 107 that sent the request (ST2502).

Figures 26, 27:
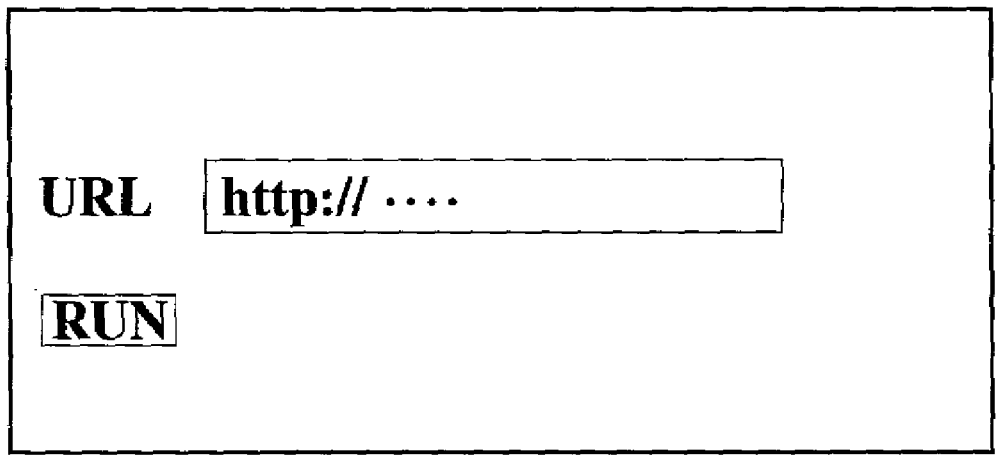
FIG. 26 is a view illustrating the display of the cellular phone when a URL input screen transmitted from the document transmission apparatus is displayed, according to the second embodiment of the present invention.
FIG. 27 is a view illustrating the display of the cellular phone when a print instruction screen transmitted from the document transmission apparatus is displayed, according to the second embodiment of the present invention.

FIG. 26 is a URL input screen output from the URL print instruction execution unit 309. The URL input screen is provided with an area to input a URL. Then, in the lower side of the area to input a URL, a "Run" key is displayed to transmit the input URL to the document transmission apparatus 100.

When the URL input screen as shown in FIG. 26 is displayed on the display of the cellular phone 107, and the user inputs a URL (ST2503), the URL print instruction execution unit 309 downloads a group of HTML files from the site of the input URL (ST2504). When the site corresponding to the input URL does not exist, the URL print instruction execution unit 309 transmits an error screen to the cellular phone 107.

When the group of the HTML files is downloaded, the URL print instruction execution unit 309 searches for a "<title>" tag from the HTML files, and obtains a title. Further, the URL print instruction execution unit 309 searches for a "<body>" tag, and extracts text data within the number of characters that can be displayed on the cellular phone 107. Further, the URL print instruction execution unit 309 extracts print destination data from the print destination management table 701, and creates a pull-down menu of print destinations by using the extracted data (ST2505).

Then, a print instruction screen including the print destination pull-down menu is transmitted to the cellular phone 107 (ST2506). FIG. 27 is a view illustrating the display of the cellular phone 107 when the print instruction screen transmitted from the document transmission apparatus 100 is displayed. The print instruction screen displays, for example, as shown in FIG. 27, "Panasonic goods information" as a title, and "Household appliance for freshmen . . . " as corresponding detailed information. Further, in the lower side of the detailed information, same as the document list screen shown in FIG. 11, menu keys "FAX", "Designate Print Destination" and "Delete" are displayed. Since a variety of screens that are displayed when these menu keys are selected are the same screens as those of the first embodiment, the detailed explanation is omitted.

Then, when the above-described print instruction screens are displayed on the display of the cellular phone 107, the document transmission apparatus 100 performs the process same as the process explained in the first embodiment. In other words, when print instruction data from the user is output from the cellular phone 107 (ST908), an acceptance result screen is transmitted to the cellular phone 107 in response to the print instruction data (ST909). Thereafter, a printer driver corresponding to a print destination (or output destination) designated by the user of the cellular phone 107 is activated (ST910), and print data in a predetermined format is generated (ST911). Here, the print data generating unit 311 generates the print data from the downloaded HTML files. Then, the document transmission apparatus 100 instructs a printer output (or fax output) of the generated print data (ST912), and transmits a print result mail to the mail address of the cellular phone 107. Then, after the print result mail is transmitted to the cellular phone 107, the group of HTML files downloaded in ST 2504 is deleted (ST2507).

As described above, the operation in which the document transmission apparatus 100 prints a group of HTML files at the print destination designated by a predetermined operation at the cellular phone 107 is terminated.

As described above, according to the document transmission apparatus 100 of the second embodiment, when the user of the cellular phone 107 looks at a desired home page screen outside of his office, by inputting a URL of a home page and a print destination, etc., by using the cellular phone 107, the home page screen can be output from the printer of the designated print destination, etc. Accordingly, when the user of the cellular phone 107 designates a printer and so on, located at a convenience store, etc., close to the current place, the user can see the designated home page screen outside of the office.

Figure 28:
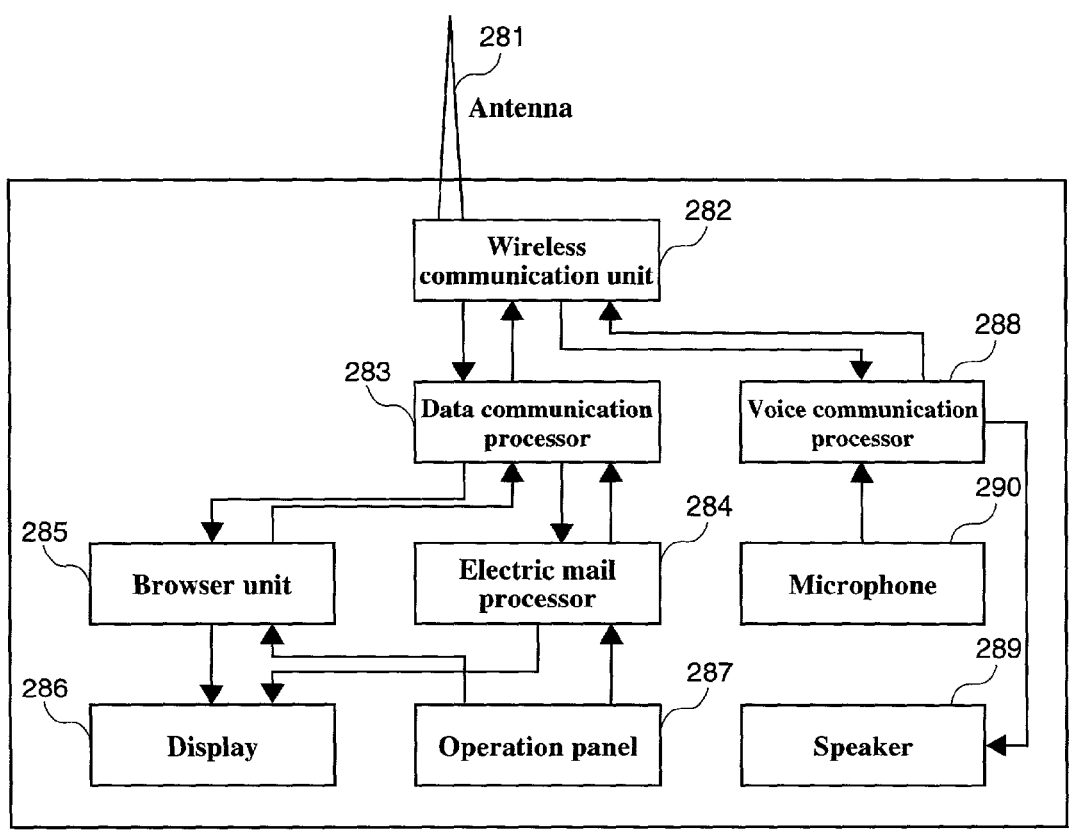
FIG. 28 is a block diagram illustration a configuration of the cellular phone according to the present invention.

FIG. 28 is a block diagram illustrating a configuration of the cellular phone 107 (FIG. 1). This cellular phone is commonly used both in the first and second embodiments. An antenna 281 receives a radio wave from a wireless telephone communication network and gives the received radio wave to a wireless communication unit 282. The wireless communication unit 282 accesses the wireless telephone communication network so as to input and output communication data and performs protocol control. A data communication processor 283 checks whether the data received via the wireless communication unit 282 is an electronic mail file or an HTML file. Further, the data communication processor 283 sends the electronic mail file and the HTML file to an electronic mail processor 284 and a browser unit 285.

The electronic mail processor 284 extracts text and/or sender information and displays the extracted text and/or sender information on the display 286. Further, the electronic mail processor 284 receives data, such as characters and instructions, input through an operational panel 287. The electronic mail processor 284 converts the data input through the operational panel 287 into an electronic mail and sends the electronic mail through the wireless communication unit 282, or the like.

The browser unit 285 analyzes the HTML file received through wireless communication and displays the HTML file as a homepage on the display 286. Further, the browser unit 285 analyzes characters, instructions, and so on, input through the operational panel 287, and send the characters, instructions, and so on, through the wireless communication unit 282, or the like.

A voice communication processor 288 converts data received through wireless communication to a voice and sound. A speaker 289 outputs the voice and sound converted by the voice communication processor 288. A microphone 290 is provided to input a voice of a user of the cellular phone. The input voice of the user is converted into data so as to be sent through the wireless communication unit 281.

The print notification mail, as shown in FIG. 10, for example, is processed by the electronic mail processor 284, and is displayed on the display 286. When the URL shown in FIG. 10, is selected through the operational panel 287, for example, by clicking on the display 286, the electronic mail processor 284 sends a request for a print instruction screen as an electronic mail through wireless communication. When the print instruction screens, as shown in FIGS. 11–14, are received via wireless communication, the browser unit 285 displays the screens on the display 286. When the print instruction information is input through the operational panel 287, for example, by clicking on the print instruction screens displayed on the display 286, the browser unit 285 sends the print instruction information through wireless communication.

Further, when the user of the cellular phone inputs an request for a URL input screen, the electronic mail processor 284 sends the request to the document transmission apparatus of the second embodiment through wireless communication. When the URL input screen is received, the browser unit 285 displays the URL input screen on the display 286. Then, the user inputs a URL in the displayed URL input screen by using the operational panel 287. The browser unit 285 sends the input URL as a request for a print instruction screen through wireless communication. When the print instruction screen, as shown in FIG. 27, is received, the browser unit 285 displays the print instruction screen on the display 287. When the user inputs print instruction information through the operational panel 287, for example, by selecting buttons included in the print instruction screen, the browser unit 285 sends the print instruction information through wireless communication.

As described above, according to the present invention, it is determined whether a predetermined electronic mail address includes an attachment file, which is a print document. A print notification mail is transmitted to a cellular phone when there is an attachment file. Then, the attachment file is output by using a printer, etc., of the designated print destination in response to the print instruction transmitted from the cellular phone. Accordingly, the user of the cellular phone can confirm the contents of the attachment file, and so on, of the electronic mail directed to the predetermined electronic mail address, outside of the office.

Further, according to the present invention, a desired home page screen is output by using a printer, and so on, of the designated print destination based on the URL transmitted from the cellular phone. Accordingly, the user can see the desired home page screen outside of the office.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-123178, filed on Apr. 24, 2000, which is herein expressly incorporated by reference in its entirety.

What is claimed is:

1. A document transmission apparatus comprising:
    a print document manager that stores a document to be printed in association with an e-mail address of a user of a cellular phone;
    a mail transmitter that transmits, when the document to be printed is stored in the print document manager, a print notification message to the address of the user of the cellular phone, the print notification message indicating that the document to be printed is stored in the print document manager;
    a printer instruction acquirer that acquires print instruction information from the cellular phone that receives the print notification message, the print instruction acquirer transmitting an instruction screen that includes an input screen to be displayed on the cellular phone and that is programmed so as to receive the print instruction information input on the input screen, the printer instruction acquirer acquiring the print instruction information returned by using the instruction screen;
    a document transmitter that transmits the document to be printed to a print destination designated in accordance with the print instruction information acquired by the print instruction acquirer;
    a management table that stores identification data related to an output device of a print destination that prints the document to be printed in associated with a print method of the print device, the management table storing a printer type and a printer address in association with the output device of the print destination;
    a print data generating unit that generates print data in a form appropriate for the printing method of the output device of the print destination designated in the print instruction information acquired from the cellular phone,
    the document transmitter determines a communication protocol based upon the printer type and the printer address of the print destination designated in the print instruction information acquired from the cellular phone, and transmits the print data to the indicated print destination by using the determined communication protocol, and
    the document transmitter transmits a print result message including a charge for the print required by the designated print destination to the e-mail address of the cellular phone, after the print data is sent to the designated print destination.

2. A document transmission apparatus comprising:
    a URL input screen transmitter that transmits, to a predetermined cellular phone, a screen to input a URL information in response to a request from the predetermined cellular phone;
    a home page information acquirer that receives the URL information from the predetermined cellular phone and accesses a web server corresponding to the URL information to obtain a home page information, the home page information acquirer obtaining the home page information in HTML format, the home page information obtaining a title from a <title> tag and text data from <body> tag;

a print instruction acquirer that acquires print instruction information from the predetermined cellular phone, the print instruction acquirer transmitting an instruction screen that includes an input screen to be displayed on the predetermined cellular phone and that is programmed so as to receive the print instruction information input on the input screen, the input instruction acquirer acquiring the print instruction information returned by using the instruction screen, the print instruction acquirer transmitting the title and the text data as a portion of the instruction screen, and a document transmitter that transmits the home page information to a designated print destination in accordance with the print instruction information acquired by the print instruction acquirer.

3. A document transmission apparatus, comprising:

a LAN controller configured to be connected to a mail server, the mail server storing an e-mail directed to a predetermined user, and to be connected to a cellular phone of the predetermined user via an Internet, the cellular phone being utilized by the predetermined user;

a first memory configured to store an e-mail address of the predetermined user of the cellular phone associated with a local mail account of the predetermined user;

a second memory configured to store printer addresses of a plurality of printers, the document transmission apparatus being able to access the plurality of printers, based on the printer addresses;

a controller configured to access the mail server via the LAN, to check for an arrival of the e-mail directed to the predetermined user by logging onto the local mail account of the predetermined user, to search the first memory for the e-mail address of the predetermined user of the cellular phone when the e-mail directed to the predetermined user is stored in the mail server, and to transmit a notification message to the e-mail address of the predetermined user of the cellular phone via the Internet, the notification message notifying the predetermined user of the cellular phone of the arrival of the e-mail directed to the predetermined user, the controller being further configured to transmit, to the cellular phone, information regarding the plurality of printers that the document transmission apparatus can access, to receive, from the cellular phone, an indication of a selection of one printer from the plurality of printers, and to transmit, to the selected printer, the e-mail directed to the predetermined user, based on a printer address of the selected printer stored in the second memory, whereby the transmitted e-mail can be printed by the selected printer.

4. The document transmission apparatus according to claim 3, wherein, when a data file is attached to the e-mail directed to the predetermined user, the controller transmits, to the selected printer, the data file which is attached to the e-mail directed to the predetermined user, based on a printer address of the selected printer stored in the second memory, and the selected printer prints the data file.

5. The document transmission apparatus according to claim 4, wherein the controller converts the file data into appropriate print data that the selected printer can print and transmits, to the selected printer, the converted print data.

6. The document transmission apparatus according to claim 3, wherein the controller transmits, to the cellular phone, as the notification message, screen data configured to be displayed on a display of the cellular phone, the screen data including a selectable print instruction, the cellular phone transmitting, to the document transmission apparatus, the print instruction when the predetermined user of the cellular phone selects the print instruction included in the screen data, the print instruction identifying the selected printer.

7. The document transmission according to claim 3, wherein the notification message includes a URL of the document transmission apparatus, the cellular phone accessing the document transmission apparatus using the URL of the document transmission apparatus.

8. The document transmission apparatus according to claim 3, wherein, when a data file is attached to the e-mail directed to the predetermined user, the controller transmits, to the cellular phone, the information regarding the plurality of printers.

9. The document transmission apparatus according to claim 8, wherein the information regarding the plurality of the printers includes a list of the plurality of printers that the document transmission apparatus can access, and includes an input member for selecting one printer from the list of the plurality of the printers.

10. The document transmission apparatus according to claim 9, wherein the printer comprises a facsimile apparatus, and when the facsimile apparatus is selected by the input member, the controller transmits, to the cellular phone, screen data configured to be displayed on a display of the cellular phone, the screen data instructing the predetermined user of the cellular phone to input a telephone number of the facsimile apparatus, the document transmission apparatus accessing the facsimile apparatus using the input telephone number.

11. The document transmission apparatus according to claim 3, wherein, when a plurality of the e-mails directed to the predetermined user are stored in the mail server, the controller transmits, to the cellular phone, screen data configured to be displayed on a display of the cellular phone, the screen data including a list of the plurality of the e-mails and an input member for selecting one e-mail from the plurality of the e-mails.

12. The document transmission apparatus according to claim 3, wherein the mail server is connected to a client computer, and the client computer transmits, to the mail server, the e-mail directed to the predetermined user.

13. The document transmission apparatus according to claim 3, wherein the controller transmits, to the cellular phone, screen data configured to be displayed on a display of the cellular phone, the screen data notifying the predetermined user of the cellular phone of an acceptance of a printer selection from the predetermined user of the cellular phone.

14. The document transmission apparatus according to claim 3, wherein the controller transmits the file data to the selected printer, using a communication protocol corresponding to the selected printer.

15. The document transmission apparatus according to claim 3, wherein the controller transmits, to the cellular phone, screen data configured to be displayed on a display of the cellular phone, the screen data including a print result message, the print result message including a charge for printing the e-mail at the selected printer.

16. A documents transmission apparatus, comprising:

a first memory configured to store an e-mail directed to a predetermined user a LAN controller configured to be connected to a cellular phone via an Internet, the cellular phone being associated with the predetermined user;

a second memory configured to store an e-mail address of the predetermined user of the cellular phone associated with a local mail account of the predetermined user;

a third memory configured to store printer addresses of a plurality of printers, the document transmission apparatus being able to access the plurality of printers, based on the printer addresses;

a controller configured to check for an arrival of the e-mail directed to the predetermined user by logging onto the local mail account of the predetermined user, to search the second memory for the e-mail address of the predetermined user of the cellular phone when the e-mail directed to the predetermined user is stored in the first memory, and to transmit a notification message to the e-mail address of the predetermined user of the cellular phone via the Internet, the notification message notifying the predetermined user of the cellular phone of the arrival of the e-mail directed to the predetermined user, the controller being further configured to transmit, to the cellular phone, information regarding the plurality of printers that the document transmission apparatus can access, to receive, from the cellular phone, an indication of a selection of one printer from the plurality of the printers, and to transmit, to the selected printer, the e-mail directed to the predetermined user, based on a printer address of the selected printer stored in the third memory, whereby the transmitted e-mail can be printed by the selected printer.

17. A method for transmitting a document using a document transmission apparatus, the document transmission apparatus being connected to a mail server, the mail server storing an e-mail directed to a predetermined user, the document transmission apparatus being connected to a cellular phone of the predetermined user via an Internet, the document transmission apparatus comprising a first memory and a second memory, the first memory storing an e-mail address of the predetermined user of the cellular phone associated with a local mail account of the predetermined user, the second memory storing printer addresses of a plurality of printers, the document transmission apparatus being able to access the plurality of printers, based on the printer addresses, the method comprising:

accessing the mail server via the LAN;

checking for an arrival of the e-mail directed to the predetermined user by logging onto the local mail account of the predetermined user;

searching the first memory for the e-mail address of the predetermined user of the cellular phone when the e-mail directed to the predetermined user is stored in the mail server;

transmitting a notification message to the e-mail address of the predetermined user of the cellular phone via the Internet, the notification message notifying the predetermined user of the cellular phone of the arrival of the e-mail directed to the predetermined user;

transmitting, to the cellular phone, information regarding the plurality of printers that the document transmission apparatus can access;

receiving, from the cellular phone, an indication of a selection of one printer from the plurality of printers;

transmitting, to the selected printer, the e-mail directed to the predetermined user, based on a printer address of the selected printer stored in the second memory; and printing the transmitted e-mail at the selected printer.

18. A document transmission apparatus, comprising:

a LAN controller configured to be connected to a cellular phone via an Internet, the cellular phone being utilized by a predetermined user;

a memory configured to store printer addresses of a plurality of printers, the document transmission apparatus being able to access the plurality of printers, based on the printer addresses;

a controller configured to transmit, to the cellular phone, first screen data configured to instruct the predetermined user of the cellular phone to input a URL, to receive, from the cellular phone, the screen data including the input URL, to access a Web server based on the input URL, to obtain, from the accessed Web server, home page information corresponding to the input URL, to transmit, to the cellular phone, second screen data configured to display information regarding the plurality of printers that the document transmission apparatus can access, to receive, from the cellular phone, an indication of a selection of one printer from the plurality of printers, and to transmit, to the selected printer, the obtained home page information, based on a printer address of the selected printer stored in the memory, whereby the obtained home page information can be printed by the selected printer.

19. The document transmission apparatus according to claim 18, wherein, when the controller obtains, from the accessed Web server, the home page information corresponding to the input URL, the controller obtains a title from a tag <title> of the obtained home page information and text data from a tag <body> of the obtained home page information, and the controller transmits, to the cellular phone, the second screen data including the obtained title and the obtained text data.

20. A method for transmitting document using a document transmission apparatus, the document transmission apparatus being connected to a cellular phone of a predetermined user via an Internet, the document transmission apparatus storing printer addresses of a plurality of printers, the document transmission apparatus being able to access the plurality of printers, based on the printer addresses, the method comprising:

transmitting, to the cellular phone, first screen data configured to instruct the predetermined user of the cellular phone to input a URL;

receiving, from the cellular phone, the screen data including the input URL;

accessing a Web server based on the input URL;

obtaining, from the accessed Web server, home page information corresponding to the input URL;

transmitting, to the cellular phone, second screen data configured to display information regarding the plurality of printers that the document transmission apparatus can access;

receiving, from the cellular phone, an indication of a selection of one printer from the plurality of printers;

transmitting, to the selected printer, the obtained home page information, based on a printer address of the selected printer stored in the memory; and printing the obtained home page information at the selected printer.

* * * * *

UNITED STATES PATENT AND TRADEMARK OFFICE
CERTIFICATE OF CORRECTION

PATENT NO. : 6,987,580 B2
APPLICATION NO. : 09/837454
DATED : January 17, 2006
INVENTOR(S) : S. Watanabe et al.

It is certified that error appears in the above-identified patent and that said Letters Patent is hereby corrected as shown below:

On the cover of the printed patent, at Item (56), References Cited, the following Foreign Patent Documents were omitted and should be included:
--8-79483    03/22/96    Japan--
--8-56241    02/27/96    Japan--

On the cover of the printed patent, at Item (56), References Cited, the following Other Publications were omitted and should be included:
--English Language Abstract of JP 8-79483--
--English Language Abstract of JP 8-56241--.

Signed and Sealed this

Twenty-sixth Day of September, 2006

JON W. DUDAS
*Director of the United States Patent and Trademark Office*